Jan. 14, 1930.                    F. A. SMITH                       1,743,575
                      SAFETY SHUTTER FOR AUTOMOBILE MIRRORS
                           Filed Sept. 9, 1926        2 Sheets-Sheet 1
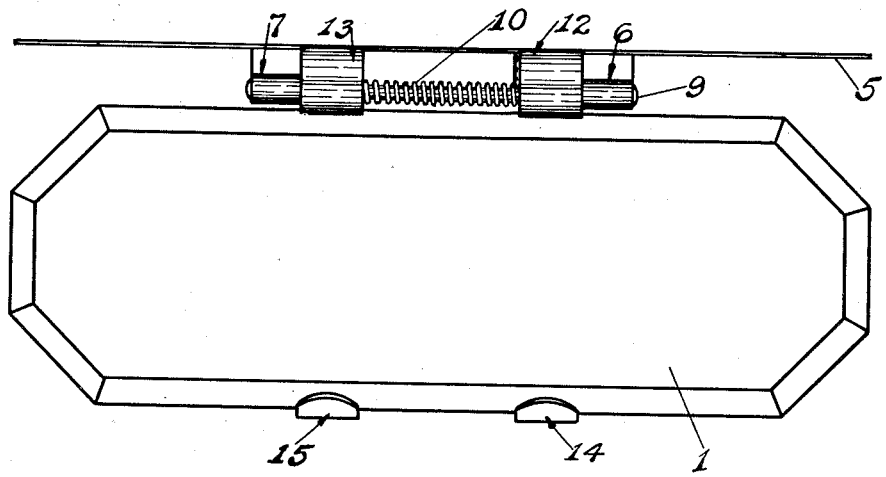
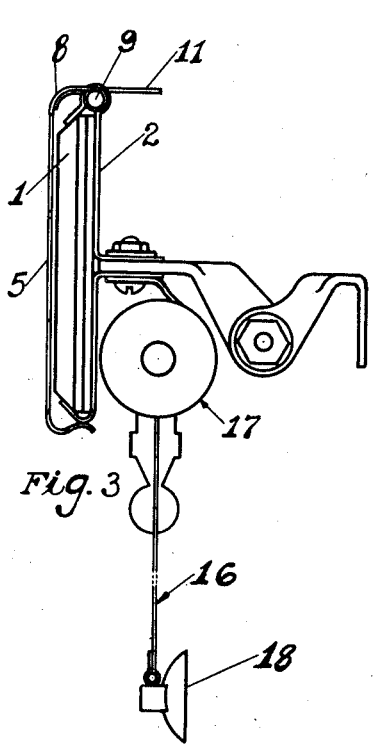
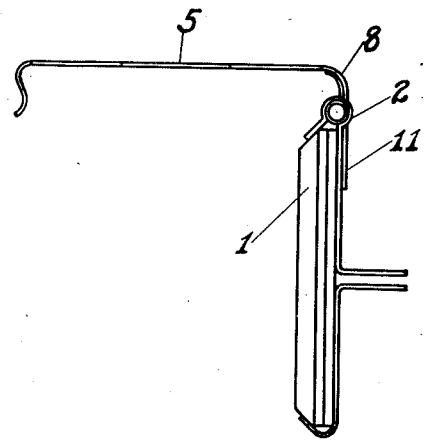
Fig.1
Fig.3
Fig.2
INVENTOR
FREDERICK A. SMITH
BY
Joseph Blacker.
ATTORNEY Jan. 14, 1930.   F. A. SMITH   1,743,575
SAFETY SHUTTER FOR AUTOMOBILE MIRRORS
Filed Sept. 9, 1926   2 Sheets-Sheet 2

INVENTOR
FREDERICK A. SMITH
BY
Joseph Blacker
ATTORNEY

Patented Jan. 14, 1930

1,743,575

UNITED STATES PATENT OFFICE

FREDERICK A. SMITH, OF NEW YORK, N. Y.

SAFETY SHUTTER FOR AUTOMOBILE MIRRORS

Application filed September 9, 1926. Serial No. 134,484.

This invention relates to safety shutters for rear view mirrors in use on automobiles. Automobiles are now generally equipped with a mirror placed in such a position that it enables the driver to view the road in the rear of his car; thus by a forward glance at the mirror he notes the condition of the traffic at the rear whenever he intends to turn to the right or left. It is well known that drivers of automobiles are often temporarily blinded by the glare of headlights striking the mirror and not being able to see the roadway they steer into a ditch or obstacle.

The main object of this invention is to provide a combined rear view mirror and safety shutter, which may be adjusted to open or shut positions in front of the driver to eliminate the glare and to protect his eyes from the reflected rays of light of the headlamps of automobiles following or approaching from the rear.

Another object of this invention is to provide a mirror shutter of a very simple construction, which will perform its intended functions efficiently.

With these and other objects in view, the invention will be hereinafter more particularly described, and the combination and arrangement of parts will be shown in the accompanying drawings and pointed out in the claim which forms part of this specification. It being understood that various changes in the form, proportion, size and minor details of construction, within the scope of the claim, may be resorted to without departing from the spirit or sacrificing any of the advantages of the invention.

Reference will now be had to the drawings, wherein like numerals of reference designate corresponding parts throughout the several views, in which:

Figure 1 is a front elevation of a mirror and shutter constructed in accordance with this invention.

Figure 2 is a side view of the mirror with the shutter in an open position.

Figure 3 is a side view of the mirror with the shutter in a closed position.

The mirror 1 is of the usual beveled glass varieties now in general use.

Figure 4:
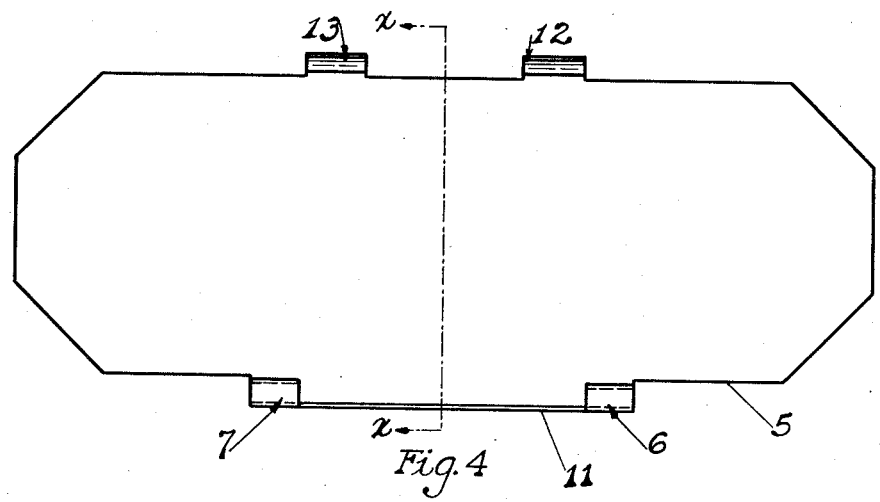
Figure 4 is a detail view of the shutter.
Figure 5:
Figure 5 is a transverse sectional view of the shutter taken on line X—X in Figure 4.
Figure 6:
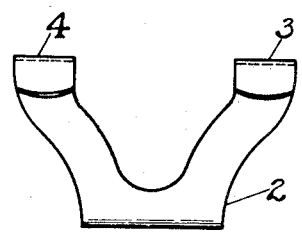
Figure 6 is a view of the upper half of the mirror bracket.
Figure 7:
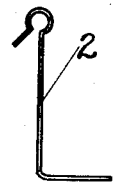
Figure 7 is a side view of the upper half of the bracket.

The upper half of the mirror bracket 2 is provided with two hinge ears 3 and 4 which extend from the upper end as best shown in Figure 6. The shutter 5 is similarly provided with two hinge ears 6 and 7 which extend from its upper end 8. The shutter is attached to the mirror by means of a pivot pin 9 which fits in and extends through all the ears 6, 3, 4 and 7. It will thus be seen that the shutter 5 may be swung upon the pivot pin 9.

Mounted upon pivot pin 9 is a coiled spring 10, one end of which is permanently fastened to the mirror bracket and the other end rests against the inner face of the shutter. In this position, the spring exerts an upward pressure against the shutter and prevents vibration.

The shutter 5 has a projection 11 between the ears 6 and 7, which is placed at right angles to the body of the shutter and serves as a stop to hold the shutter in a horizontal position as shown in the open position of the shutter in Figure 2.

The shutter is provided with two curved arms 12 and 13, facing the driver. These arms are placed on opposite sides of the centre line of the mirror and are designed to engage the two arms 14 and 15 of the lower half of the mirror bracket, so as to hold the shutter in a closed position against the upward pressure of the spring.

The arms 12 and 13 are designed of suitable width to give the necessary strength and holding power, and are curved as shown, to give them the required resiliency. The shape of the shutter is made to conform to the shape of the mirror, which is generally that of a rectangle with the edges beveled to a forty-five degree angle.

The bracket is preferably of the usual two piece design, the two parts being clamped together by a screw and nut at the centre line and arranged to give the necessary swivel action. The only departure from present practice of bracket construction lies in the addition to the upper half of the bracket of two hinge ears 3 and 4 to provide a housing for the pivot pin 9.

It is thus seen that with the shutter structure as described, the mirror may be permanently set to any desired angle and that it will stay set, as the operation of the shutter does not in any way affect the position of the mirror.

Referring to Figure 3, it will be noted that there is suspended from the bracket in the rear of the mirror a safety shade 16, designed to eliminate the glare of automobile headlamps approaching from the front; also the glare due to the sun's rays. This shade is housed in a hollow casing 17 when it is in a closed position, and a suction button 18 is used to maintain the shade in a fixed relation to the windshield when the shade is in an open position.

Having thus described my invention, I claim as new and desire to secure by Letters Patent:

The combination of a rear view mirror for automobiles and a shutter made of non-translucent material and hinged to said mirror and movable at will in front thereof so as to prevent the rays of light being reflected from said mirror, said mirror being held in a bracket having a pivot mounted thereon, and upper and lower arms to grasp the mirror, said shutter being resiliently operated for instantaneous action so as to cover and uncover the mirror and operating on said pivot, said shutter being inseparably united with the mirror bracket as a unit, said shutter having an offset projection cooperating with said bracket and acting as a stop when the mirror is uncovered, said offset projection also acting against the bracket so as to prevent vibration when in open position, said shutter being provided with a resilient arm to grasp the lower bracket arm and resilient means to lift the shutter when the resilient arm is disengaged from the lower bracket arm, thereby permitting a snap action in opening and closing of the shutter.

FREDERICK A. SMITH.